United States Patent [19]
DeCoene

[11] Patent Number: 4,520,721
[45] Date of Patent: Jun. 4, 1985

[54] ROUND BALER WITH VERTICALLY ORIENTED START CHAMBER

[75] Inventor: Frans J. G. C. DeCoene, Zedelgem, Belgium

[73] Assignee: Sperry Corporation, New Holland, Pa.

[21] Appl. No.: 594,004

[22] Filed: Mar. 27, 1984

[30] Foreign Application Priority Data

Mar. 29, 1983 [GB] United Kingdom ............... 8308563

[51] Int. Cl.³ ..................... B30B 5/06; A01D 39/00
[52] U.S. Cl. ........................................ 100/88; 56/341
[58] Field of Search ................ 100/87, 88, 5; 56/341, 56/342, 343

[56] References Cited

U.S. PATENT DOCUMENTS 4,172,355 10/1979 Blanshine ............................. 56/341
4,182,101 1/1980 Gaeddert et al. ..................... 56/341
4,252,057 2/1981 Gaeddert et al. ..................... 100/88
4,273,036 6/1981 Kopaska .............................. 100/88
4,393,764 7/1983 Viaud .................................. 100/88

FOREIGN PATENT DOCUMENTS 35114 1/1981 European Pat. Off. .
46426 8/1981 European Pat. Off. .

Primary Examiner—Peter Feldman
Attorney, Agent, or Firm—Darrell F. Marquette; Frank A. Seemar; Larry W. Miller

[57] ABSTRACT

A round baler includes front and rear expandable members arranged to form a vertically oriented start chamber which expands to a cylindrical shape during bale formation. An arm which supports the front expandable member is pivotally mounted and carries guide members at its ends around which the front expandable member passes. Upper and lower T-shaped supports which support the rear expandable member are pivotally mounted, and each T-shaped support carries a pair of guide members for engaging the rear expandable member.

11 Claims, 15 Drawing Figures

4,520,721

ROUND BALER WITH VERTICALLY ORIENTED START CHAMBER

BACKGROUND OF THE INVENTION

This invention relates to agricultural balers and more particularly to so-called round balers which produce cylindrical bales or rolls of crop material.

In general, round balers are of two types: the expanding chamber type which produces bales with a relatively hard core and a generally high and relatively constant density throughout; and the fixed chamber type which produces bales with a relatively soft core but a relatively compacted or hard outer layer or shell.

The advantages of expanding chamber balers are that they pack more crop material into a bale compared with a similarly sized soft core bale, and they can produce bales of any size up to the maximum which a given machine is capable of producing, with all sizes of bales being in generally good order from the standpoint of being subjected to handling without falling apart. The advantages of fixed chamber balers are that they produce bales with a reduced tendency to molding if the crop material is baled wet and the soft bale core presents no problems to cattle when feeding from the bale, whereas hard bale cores can be difficult to tear apart. Fixed chamber balers produce with good weathering characteristics due to the hard shell, which ensures a bale which is very stable when being handled. Fixed chamber balers are of relatively simple design and they normally have no difficulty in forming a bale core which can sometimes be a problem with expanding chamber balers when handling short lengths of crop material.

U.S. Pat. No. 4,182,101 discloses a round baler of the expanding chamber type which has a single endless web in the form of a series of side-by-side belts extending around a plurality of rollers to define a vertically disposed bale starting chamber. One of the rollers is supported by a pair of arms that are pivotally mounted to the side walls of the baler. Springs are provided to normally urge the arms in a downward direction to maintain tension in the belts.

SUMMARY OF THE INVENTION

The present invention provides a round baler having a base frame, side walls attached to the base frame, and first and second expandable members arranged to define together with the side walls an initial generally vertically oriented wedge-shaped start chamber which expands to a generally cylindrical shape during bale formation. An arm is provided for supporting the first expandable member. The arm is pivotally mounted to at least one of the side walls and carries guide members at the ends thereof around which the first expandable member passes. Upper and lower T-shaped supports are provided to support the second expandable member. The T-shaped supports are pivotally mounted on at least one of the side walls and carry guide members for engaging the second expandable member. The arm is normally urged in a direction to maintain tension in the first expandable member, and the T-shaped supports are normally urged in opposite directions relative to each other to maintain tension in the second expandable member.

DETAILED DESCRIPTION OF THE PREFERRED EMBODIMENT

Figure 1:
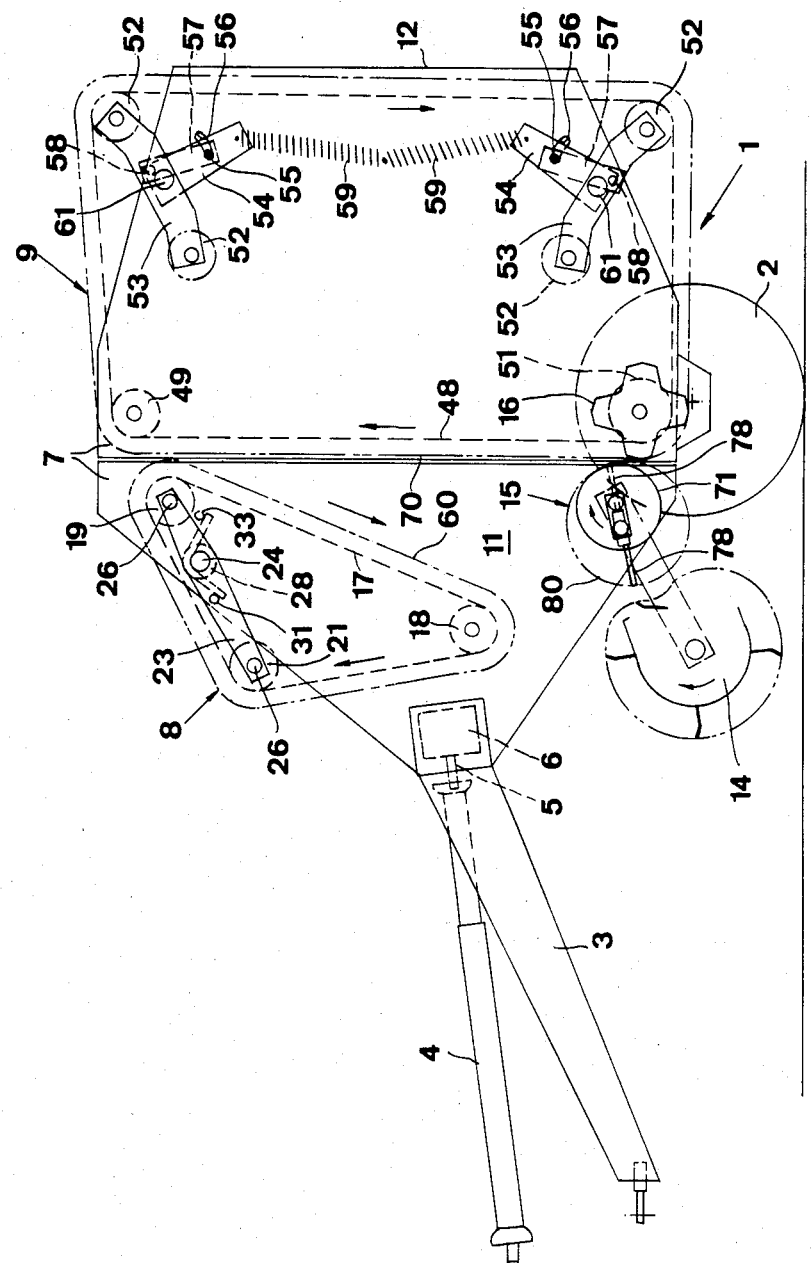
FIG. 1. is a schematic side view of a first embodiment of round baler showing the machine empty.
Figure 2:
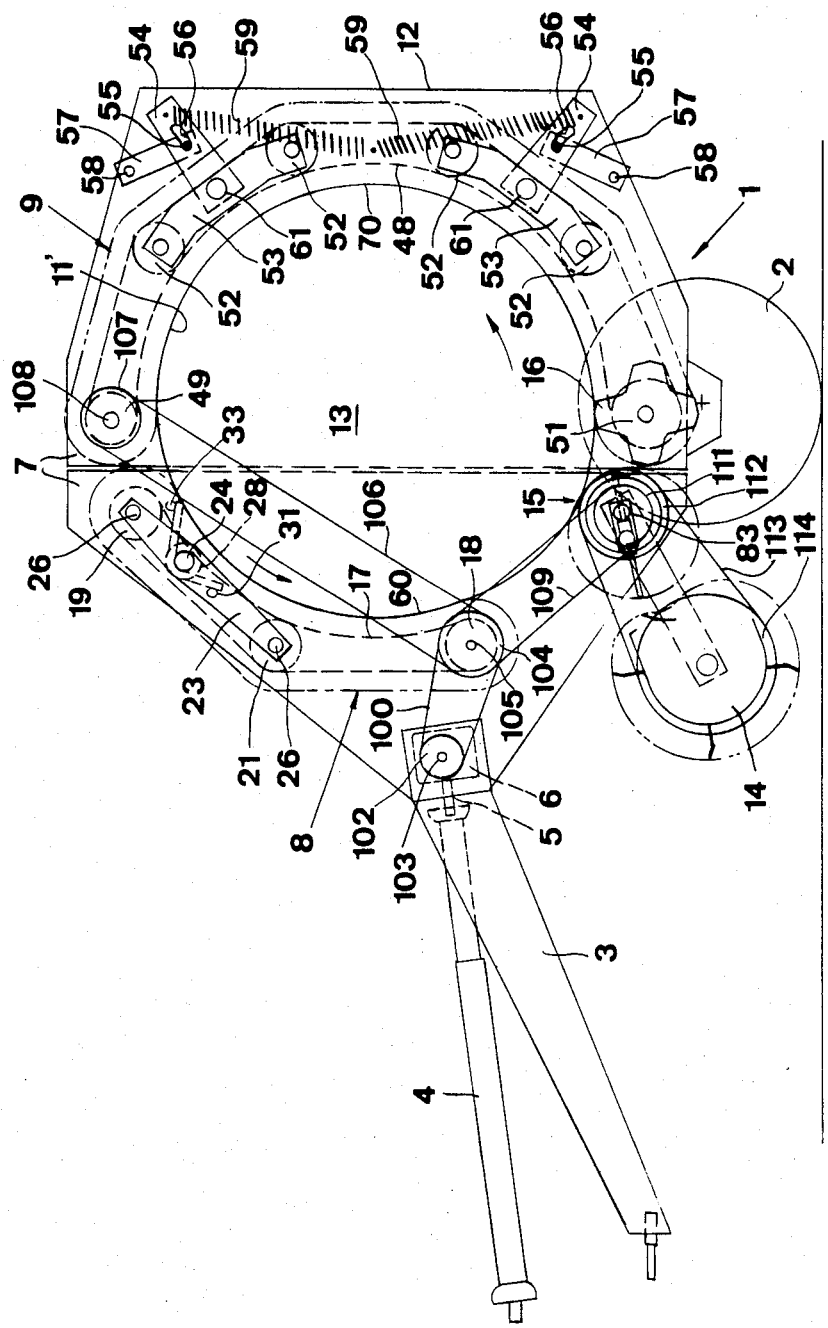
FIG. 2 is a view similar to that of FIG. 1 but showing the machine with a completed bale.

Referring to FIGS. 1 and 2, the first embodiment is in the form of a pull-type round baler comprising a base frame 1 carrying a pair of ground engaging wheels 2 and having attached thereto a drawbar 3 for connection to a tractor (not shown) or other towing vehicle. A drive shaft 4 extends above the drawbar 3 and is connected at one end to an input shaft 5 of a gearbox 6, and connectable at the other end to a power-take-off shaft (also not shown) of the towing vehicle. Side walls 7 of the machine are attached to the base frame 1, the side walls 7 partially defining a bale forming chamber by providing the sides therefor. The front and rear of the bale forming chamber are defined by portions of respective front and rear expandable members 8 and 9 which, when the machine is empty (FIG. 1) form together with the side walls 7 a generally vertically oriented, wedge-shaped (as seen in side view) start chamber 11, and which expand on the formation of a bale to form a cylindrical bale chamber shape 11' (FIG. 2). Each side wall 7 is split, with the front expandable member 8 forming a front portion of the bale chamber in conjunction with one portion of each side wall 7, and the rear expandable member 9 forming a rear portion of the bale chamber in conjunction with the other portion of each side wall 7.

As seen in FIGS. 1 and 2, the rear portion of the bale chamber is larger than the front portion and is disposed in a tailgate 12 for the machine which is pivotable upwardly in order to effect discharge of a completed bale 13 (FIG. 2) from the machine. With this differential sizing of the front and rear portions of the bale chamber, the center of gravity of a completed bale lies within the rear portion of the bale chamber, whereby there is a natural tendency for a completed bale to roll from the machine once the tailgate 12 has been raised, which tendency greatly facilitates bale discharge.

Pivotally mounted at the front of the machine is a conventional crop pick-up unit 14 which, in use, picks up crop material from the ground and delivers it to a combined crop feeder and bale support device 15 located at the bottom of the bale start chamber 11. Located within the rear portion of the bale chamber and disposed at the front bottom corner thereof adjacent the feeder and support device 15 is a rotor 16 which extends between the side walls 7. The rotor 16 also helps to support a bale during its formation.

Having described the overall machine in general, certain components will now be described in greater detail with reference to FIGS. 3 to 12, in addition to FIGS. 1 and 2, of the drawings. Looking first at the bale chamber, the front expandable member 8 partially defining the front of the chamber comprises two transversely spaced apart endless chains 17 each extending around a driven sprocket 18, an idler sprocket 19 and a non-toothed guide roller 21 disposed in a triangular arrangement as seen in side view in FIGS. 1 and 2. The chains 17 are disposed toward, but inset from the respective sides of the machine and are interconnected by a plurality of slats 22 which extend transversely of the machine, with each end of each slat 22 extending past the associated chain 17 and terminating just short of the side walls 7 as seen in FIG. 5. The construction of each slat 22 will be described hereinafter.

Figure 4:
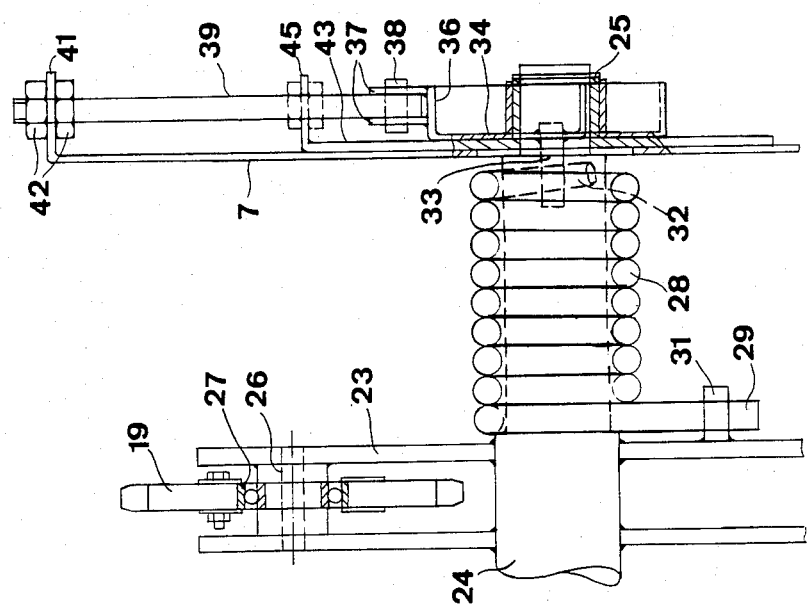
FIG. 4 is a side view of FIG. 3.
Figure 3:
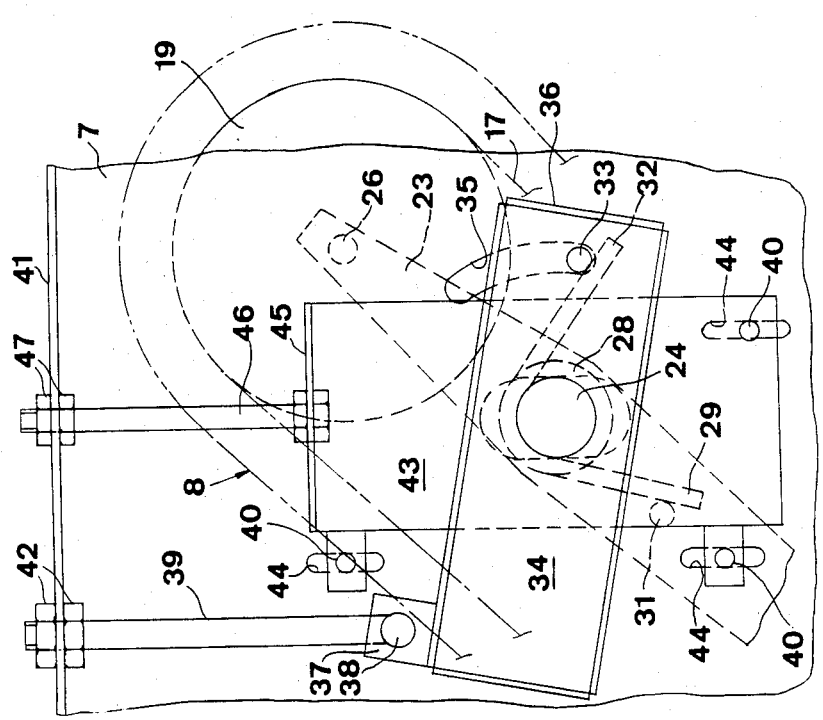
FIG. 3 is an enlarged view of a portion of FIG. 1.
Figure 5:
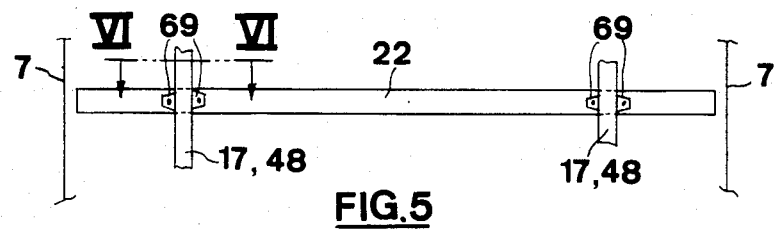
FIG. 5 is a schematic view of a component of FIG. 1.

Referring to FIGS. 3 and 4, the sprocket 19 and guide roller 21 associated with each chain 17 are mounted for rotation on an arm 23 which in turn is pivotally mounted on the frame 1 via a pivot shaft 24 which is common to both arms 23. The pivot shaft 24 is offset from the centers of the arms 23 and is carried in bushings 25. It will be seen from FIG. 4 that each arm 23 comprises a pair of spaced members between which extend two spigots 26 on which the sprocket 19 and guide roller 21 are respectively mounted via bearings 27, only the sprocket 19 being shown in FIG. 4. The pivot shaft 24 has, at each end, a first portion of reduced diameter around which is disposed a torsion spring 28, and a second portion of further reduced diameter which is received by the associated bushing 25. Each spring 28 serves to bias the associated arm 23 in a clockwise direction as seen in FIGS. 1 and 2, whereby tension in the chain 17 is maintained and any slack therein resulting from wear is automatically taken up. The pivotal mounting of the arms 23 allows them to rotate as a bale is being formed as will be described.

This tensioning of each chain 17 is achieved by locating one end 29 of each spring 28 against a stop 31 fixed to the related arm 23, and locating the other end 32 of each spring 28 against a stop 33 fixed to one end of an arm 34 located on the outside of the associated side wall 7, the stop 33 extending through an arcuate slot 35 in the side wall 7. Each arm 34 is pivotally mounted on the pivot shaft 24 via the associated bushing 25 and has a reinforcing flange 36 extending around its periphery and away from the side wall 7 as seen in FIG. 4. A bracket in the form of two spaced plates 37 is attached to the end of each arm 34 opposite the stop 33, a pivot pin 38 extends between the plates 37 and is attached to one end of a threaded rod 39, the other end of which is received by a flange 41 provided on the related side wall 7. Nuts 42 adjustably secure each rod 39 to the related flange 41, whereby the arms 34 can be adjusted about the pivot shaft 24 so as to move the stops 33 in the slots 35 thereby adjusting the torsion in the springs 28 and the initial tension in the chains 17.

The arms 23 and pivot shaft 24 are vertically adjustably mounted with respect to the related side walls 7 since the ends of the pivot shaft 24 and the bushings 25 are carried by respective plates 43 secured by bolts 40 to the side wall 7 with the bolts 40 disposed in slots 44 provided in the side wall 7 to permit relative sliding movement of the plates 43. Each plate 43 is formed with a flange 45 to which is attached one end of a threaded rod 46, with the other end of rod 46 adjustably attached to the related side wall flange 41 by nuts 47. Adjustment of the nuts on rod 46 after loosening the bolts 40 either raises or lowers the plates 43 relative to the side walls 7 so as to move the pivot shaft 24, and hence the arms 23, to a desired position.

After this adjustment, the pivot shaft 24 and the arms 23 coupled thereto are firmly held in the desired position by the nuts 47 and the threaded rod 46, and also by the bolts 40 firmly tightened to the side walls 7. It will be noted that by this adjustment, the position of the sprockets 19 relative to fixed upper sprockets 49 of the rear expandable member 9, when the baler is empty, can be changed. It will also be noted that, as a bale is being formed in the bale chamber, the sprockets 19 move upwardly and away from the fixed upper sprockets 49 of the rear expandable member 9 by virtue of the arms 23 supporting the sprockets 19 pivoting in a counter clockwise direction as seen in FIGS. 1 and 2. This movement of the sprockets 19 has been kept to an acceptable minimum by locating the pivot shaft 24 substantially offset relative to the center of the arms 23, so that the sprockets 19 are positioned closer to the pivot shaft 24 than the guide rollers 21. Using the adjustability of the pivot shaft 24 in a generally vertical direction, the front expandable member 8 is set so that, in the empty condition of the baler, the sprockets 19 are positioned slightly lower than the fixed sprockets 49 of the rear expandable member 9 and as close as possible to the forward, generally vertical inner course 70 of the rear expandable member 9 without engaging the rear expandable member 9.

It will also be noted that, as a bale is being formed in the bale chamber, the arms 23 pivot counterclockwise as seen in FIGS. 1 and 2, until the guide rollers 21 engage the inner and outer runs of the endless chains 17. At this moment, further pivoting of the arms 23 in the counterclockwise direction, and further expansion of the inner course 60 of the expandable member 8 becomes impossible with the inner course 60 assuming a virtually fixed position which is very much the same as the fixed position assumed by the bale forming means in the type of baler with a fixed bale chamber.

The rear expandable member 9 comprises a pair of spaced endless chains 48 located adjacent, but inset from, the respective side walls 7 and interconnected by a plurality of slats 22, the construction of which will be described later. The slats 22 extend beyond the chains 48 and terminate just short of the side walls 7 as shown in FIG. 5. Each chain 48 extends around an upper fixed sprocket 49, a lower fixed sprocket 51 associated with the rotor 16, and movable guide rollers 52. The rollers 52 are arranged in upper and lower pairs. When the machine is empty (FIG. 1), only one roller 52 of each pair is in engagement with the chains 48, but when a bale nears completion, both rollers 52 of each pair are in engagement with the chains 48. Also, as a bale nears completion, both the inner and outer runs (as seen in FIG. 2) of the chains 48 engage the rollers 52. The rollers 52 of each pair are rotatably mounted on respective ends of a crosspiece 53 of a generally T-shaped support, the stem 54 of which is provided with a pivot pin 55 intermediate its ends. Each pivot pin 55 extends from the stem 54 through an arcuate slot 56 in the associated side wall 7 and is attached to a support arm 57 which is pivotally mounted at 58 on the side wall 7 at the center of curvature of the slot 56. The end of each stem 54 of the T-shaped support remote from the crosspiece 53 is connected to one end of a tension spring 59, with the other end of the spring 59 attached to the associated side wall 7. The two upper crosspieces 53 and the two lower crosspieces 53 are interconnected by respective transverse tubular beams 61 to ensure that the two upper and two lower T-shaped supports pivot in unison. The springs 59 serve in the empty condition of the baler, to bias the upper T-shaped supports in a clockwise direction, and to bias the lower supports in a counter clockwise direction, as viewed in FIG. 1, whereby one roller 52 of each pair engages the associated chain 48 to maintain tention therein and take up any slack in the chain 48, resulting from wear. Also, the support arms 57 are pivoted in a direction towards the bale start chamber 11 until the pivot pins 55 engage the forward ends of the arcuate slots 56. It will also be noted that in this empty baler condition, the rear expandable member 9 assumes a generally rectangular configuration in side view with inner course 70 defining the rear surface of the bale start chamber 11 and being oriented generally vertically as seen in FIG. 1.

As a bale is being formed in the bale chamber, the inner course 70 of the rear expandable member 9 is moved rearward and expanded against the force of the springs 59 between the top and bottom sprockets 49 and 51, respectively. As the bale nears completion, both guide rollers 52 of each pair first engage the outer runs of the respective chains 48 and ultimately, the inner runs of the chains 48 also engage the guide rollers 52. Any stretching of the chains 48 resulting from wear is compensated by the T-shaped supports moving generally radially outwardly about the pivot mountings 58, whereby the pivot pins 55 are moved away from the inner ends of the slots 56.

It will be understood that, like the inner course 60 of the front expandable member 8, the course 70 of the rear expandable member 9 also cannot expand any further once both the inner and outer runs of the chains 48 engage the guide rollers 52. Thus, the course 70 of the rear expandable member 9 assumes a virtually fixed position such as the bale forming means in a fixed chamber baler.

Since the guide rollers 21,52 at times engage the opposed inner and outer runs of the respective associated chains 17,48, these guide rollers 21,52 must have smooth outer surfaces, instead of toothed outer surfaces, such as sprockets which would interfere with the proper simultaneous guidance of both runs of the chains.

Figure 6:
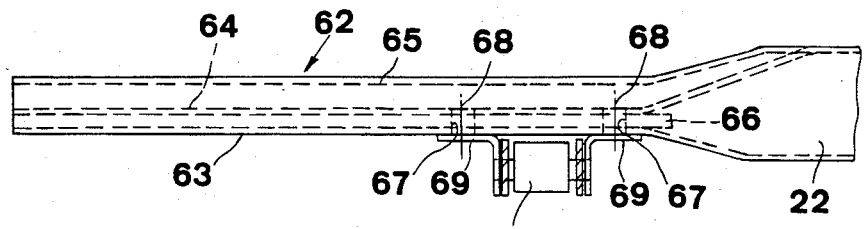
FIG. 6 is a partial sectional view, on the linve VI—VI of FIG. 5.
Figure 7:
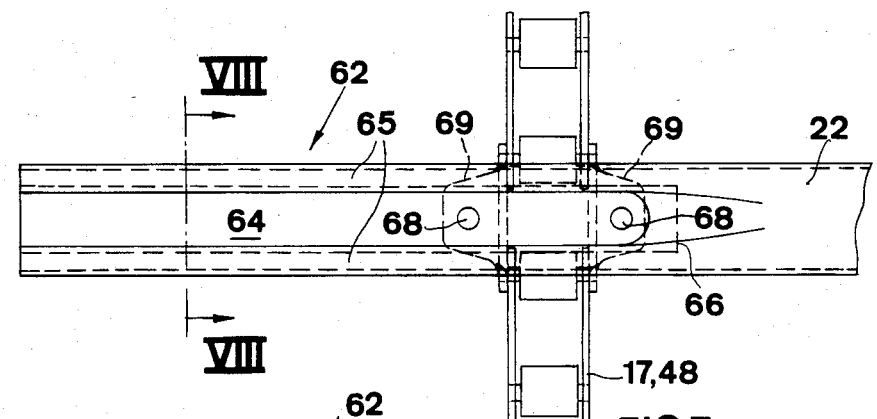
FIG. 7 is plan view of FIG. 6.
Figure 8:
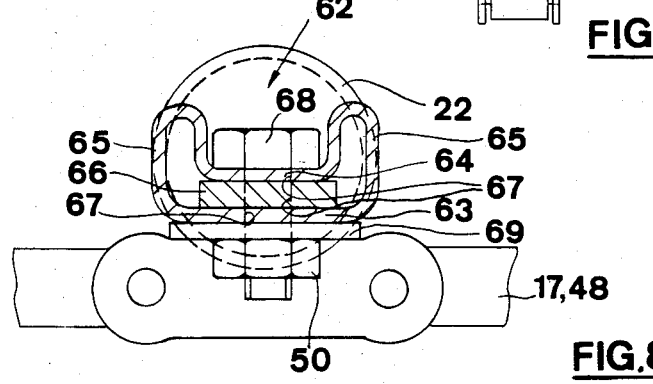
FIG. 8 is a sectional view on the line VIII—VIII of FIG. 7.

Referring to FIGS. 6 to 8, it will be seen that the slats 22 forming part of both the front and rear expandable members 8 and 9 are formed from tubular stock and, as already mentioned, extend essentially the full width of the machine. The chains 17 and 48 are inset from the ends of the slats 22, as already described with reference to FIG. 5, in order to reduce the unsupported central length of each slat and to lessen the chance of the slats flexing and being permanently deformed while a bale is being formed. Each slat 22 is flattened at each end with the flattened portion 62 extending from the end of the slat to just beyond the point of connection to the chain 17 or 48. As best seen in FIG. 8, the flattened portion 62 of each end of each slat 22 comprises a flat bottom portion 63 and an opposed top portion having a longitudinally-extending central portion 64 extending parallel to, but spaced from, the bottom portion 63 and being flanked by two upstanding portions 65. Thus the top surface of each flattened slat portion 62 is channel-shaped.

The flattening of the ends of the slats 22 destroys the inherent strength of the previous tubular stock and in order to restore this strength, a fillet or insert 66 cut from flat metal strip is disposed inside each flattened portion 62 in the space between the bottom portion 63 and the top central portion 64. Two longitudinally-spaced bores 67 are formed through each flattened portion 62, as well as through the insert 66, for the reception of bolts 68 by which the slat 22 is attached to lugs 69 carried on the associated chain 17, 48, with the lugs 69 being provided with holes to receive the bolts 68. It will be noted from FIG. 8 that the upstanding portions 65 of the flattened end portions 62 extend above the heads of the bolts 68, whereby the bolts 68 are protected from excessive abrasive wear by the crop material, and the likelihood of crop material getting hooked around the bolt heads is reduced. It will also be noted that the upstanding portions 65 lie generally within the outer periphery of the slat 22 as seen in FIG. 8. The threaded ends of the bolts 68 and the nuts 50 cooperating therewith are positioned on the sides of the chains 17,48 facing away from a bale being formed. The chains 17,48 with the lugs 69 thereon are commercially available.

It will be understood that the front and rear surfaces of the start chamber 11 are defined respectively by the slats 22 on the inner runs of the chains 17 extending between the sprockets 18,19 and by the slats 22 on the inner runs of the chains 48 extending between the upper and lower sprockets 49,51. These surfaces change shape as a bale is formed, being transformed from linear to arcuate as has already been mentioned and as will be further described in more detail.

Figure 10:
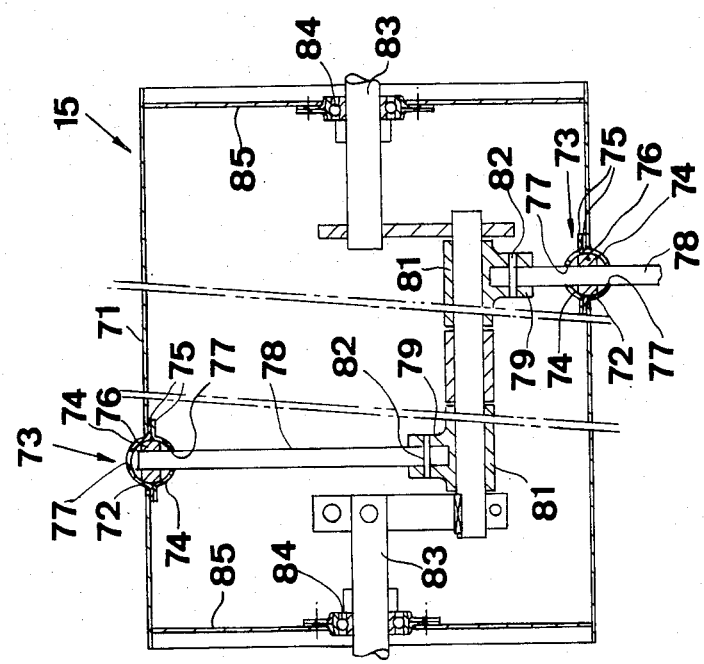
FIG. 10 is a partial sectional view on the line X—X 20 of FIG. 9.
Figure 9:
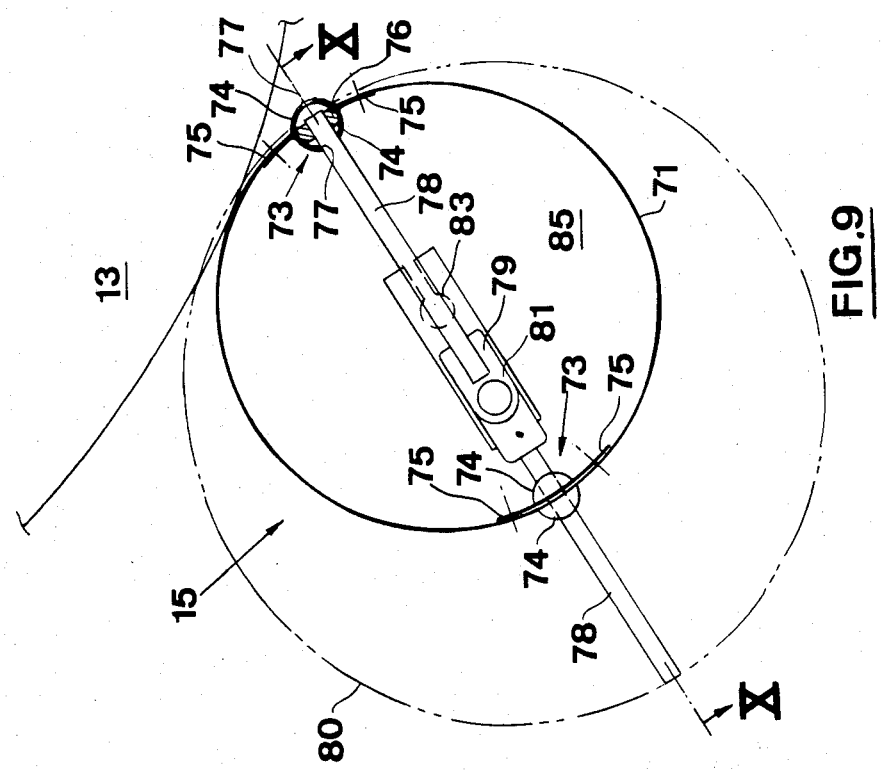
FIG. 9 is an enlarged view of a still further component of FIG. 1.

Referring to FIGS. 9 and 10, the combined crop feeder and bale support device 15 comprises a hollow drum 71 having a smooth outer surface and provided with two diametrically opposed rows of apertures 72 each of which receives an insert 73 from within the drum 71 with the insert 73 being bolted to the drum 71. Each insert 73 comprises two hemispherical shells 74 formed with flanges 75 by which the insert 73 is bolted to drum 71. The sphere formed by the two shells 74 contains a bushing 76 formed of elastomeric synthetic plastics material. Each shell 74 has an aperture 77 therethrough for a rod or finger 78 mounted in a radial extension 79 of a bushing 81 formed of elastomeric synthetic plastics material. Each rod 78 is retained in the extension 79 by a pin 82, and each bushing 81 is rotatably mounted on a stationary crankshaft 83 the ends of which are received in bearings 84 provided in end plates 85 of the drum 71. The drum 71 is driven and rotates around the crankshaft 83, whereby the rods 78 are alternately extended from the outer surface of the drum 71 adjacent the pick-up unit 14 and retracted into the drum 71 adjacent the rotor 16 by sliding in and out of the apertures 77 and bushings 76, with the ends of the rods 78 describing the circle indicated at 80.

When the baler is empty, the combined crop feeder and bale support device 15, together with the courses 60,70 of the expandable members 8,9 define the generally wedge-shaped bale start chamber 11 with the device 15 being located at a distance beneath the lower end of the front expandable member 8 to form a bale chamber inlet opening. The device 15 is mounted proximate, but forwardly of the rotor 16 so that, in the empty condition of the baler, the generally vertical course 70 of the rear expandable member 9 is rearward of the device 15. The device 15 in part forms the bottom of the bale start chamber 11.

The device 15 is positioned relative to the lower sprockets 18 of the front expandable member 8 and the rotor 16 (which is part of the rear expandable member 9) so that, as a bale is nearing completion within the bale chamber, the bale is supported at least in part by the drum 71 of the device 15. Hence the drum 71 is positioned, together with other components of the machine on a circumference defining the cylindrical bale chamber shape 11′, However, the device 15 is also positioned relative to the cylindrical bale chamber shape 11′ so that, as a bale is being formed in the bale chamber its center of gravity is moved from a position located generally above the device 15 to a position located rearward of the device 15.

The fingers 78 are substantially in their retracted position at the point on the drum 71 where a bale is supported by the drum 71, thereby avoiding the fingers 78 penetrating into the bale and adversely affecting the surface thereof. The fingers 78 are fully extended at the side of the drum 71, facing the pick-up unit 14 in order to take over crop material therefrom.

Figure 11:
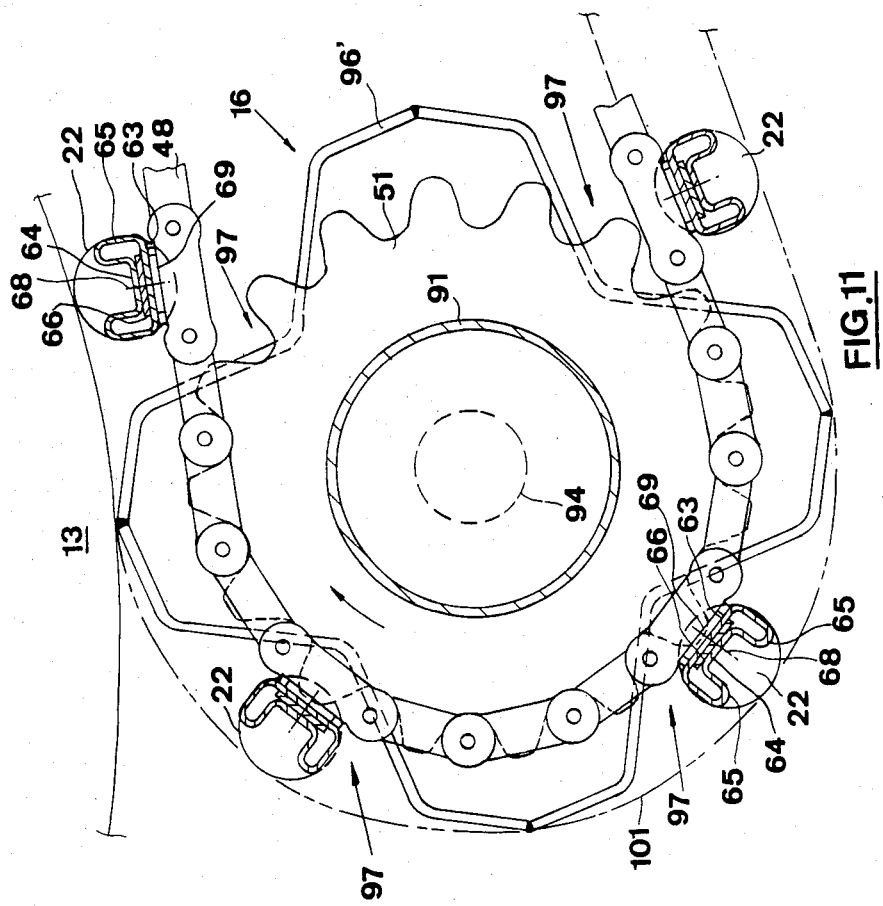
FIG. 11 is an enlarged view of yet another position of FIG. 1.
Figure 12:
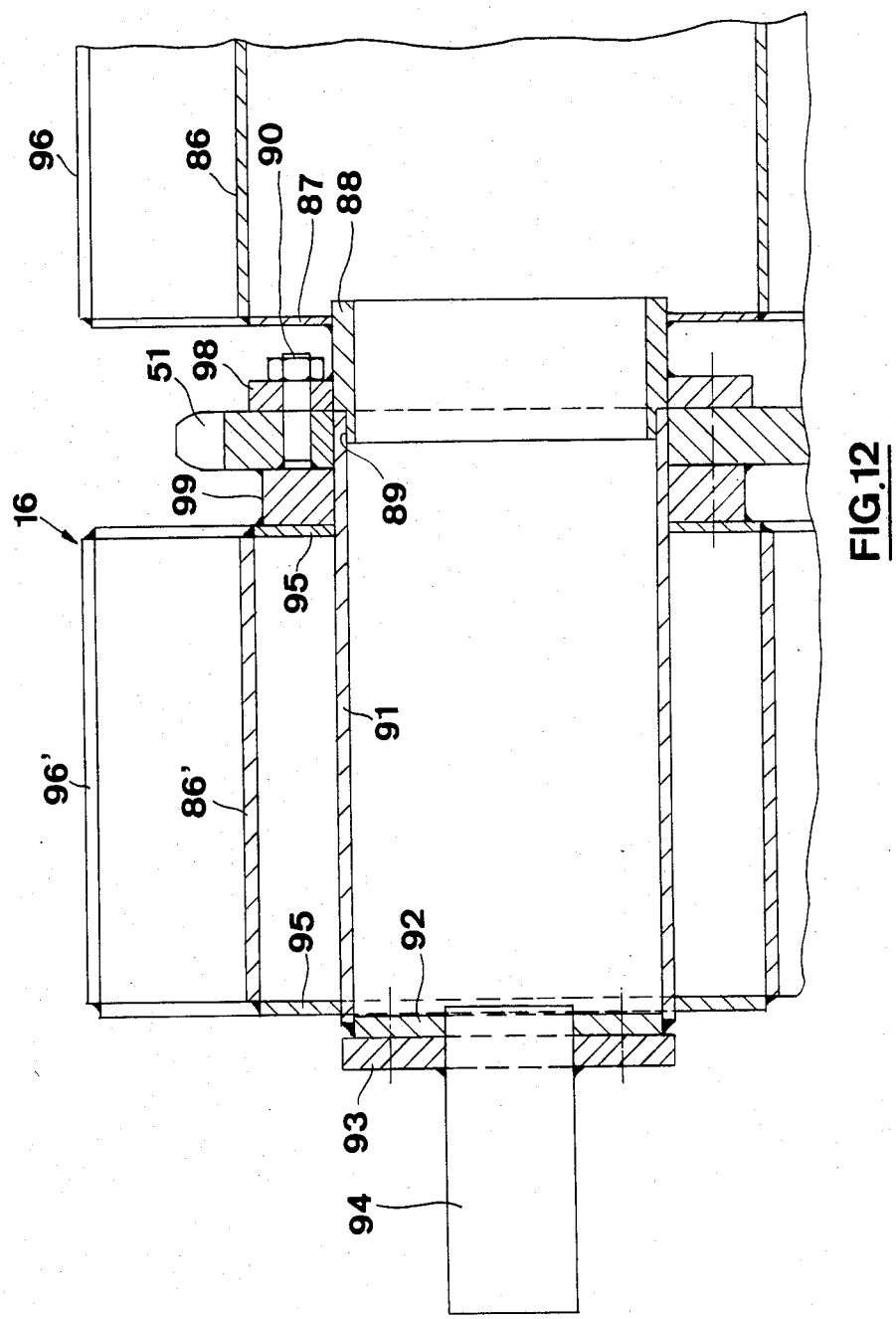
FIG. 12 is a partial longitudinal section of the component of FIG. 11.

Referring to FIGS. 11 and 12, the rotor 16 will now be described. The function of the rotor 16 is to help support a bale during formation without imparting any substantial vibration to the bale which might impair the formation thereof or cause unacceptable wear and damage to the machine. As already described, the chains 48 extend around sprockets 51 associated with the rotor 16 and if the rotor 16 were not provided, the slats 22 of the rear expandable member 9 would continuously impact with the bale being formed, in a manner that would attempt to raise the bale on each occasion of impact and thus subject the bale to vibration in a generally vertical direction. The rotor 16 overcomes this problem by providing pockets for the slats 22 to enter before and as they impact the bale, whereby the rotor 16 together with the slats 22 received in the pockets thereof, provide a substantially smooth or continuous surface on which the bale is supported.

The rotor 16 comprises a hollow tubular core 86 extending between the two sprockets 51 and closed at each end by a plate 87 formed with a tubular extension 88 of reduced diameter concentric with the core 86, and formed with an annular recess 89 around its outer end. The recess 89 receives one end of a tube 91 having the same outer diameter as the extension 88 and being closed at its outer end by an end plate 92 which is bolted to a flange 93 carried by a stub shaft 94 by which the rotor 16 is mounted for rotation in bearings (not shown) provided in the respective side walls 7. Each tube 91 is surrounded along the majority of its length by a further tube of the same outer diameter as the core 86 and representing an extension 86′ of core 86. Each core extension 86′ is supported by two annular end plates 95 carried by the tube 91.

On the main core 86 and the two core extension 86′ of the rotor 16 there are mounted respective outer rotor surface members 96 and 96′, which are generally star-shaped in cross-section as seen in FIG. 11, thus providing four longitudinally extending pockets 97 for the reception of the slats 22 associated with the chains 48. The surface members 96,96′ are each formed from four identically shaped sections of sheet metal which are welded together at the four points of the star shape and which are welded to the respective end plates 87,95 of the rotor 16.

The two sprockets 51 associated with the rotor 16 are each welded to an annular disc 99 attached to the tube 91. On assembly, the tubes 91 are slid into the recesses 89 in the extension 88 and the sprockets 51 are bolted to respective discs 98 secured to the extensions 88 via bolts 90 which are welded to the sprockets 51. Thus the sprockets 51 are inset from the outer ends of the rotor 16 to engage the chains 48.

As the rotor 16 rotates, the slats 22 move into the pockets 97 as the chains 48 pass around the sprockets 51, whereby a substantially continuous support surface is contacted by the bale being formed. In this respect, it will be seen from FIG. 11 that when a slat 22 is received in a pocket 97, the outer surface of the slat 22 is located on the circle 101 circumscribed by the outer points of the surface members 96,96′ of the rotor 16.

From FIG. 2, it will be undertood that only part of the weight of a bale being formed in the bale chamber is supported on the rotor 16 with another part of the bale weight being supported, as already mentioned, by the combined feeder and bale support device 15.

It should be noted that the number of teeth on each sprocket 51 is N times the number of links in the chains 48 between adjacent slats 22, where N is an integer, although preferably not one. Also, the number of teeth on each sprocket 51 is a multiple of the number of pockets 97 provided in the rotor 16. It will be seen from FIG. 11 that in the first embodiment, each sprocket 51 has sixteen teeth which is a multiple of the four pockets 97 and which makes N=4 since a slat 22 is attached to every fourth link of the chains 48.

The drives for the various driven components of the baler are shown in FIG. 2 of the drawings, having been omitted from FIG. 1 for clarity. A sprocket 102 on the output shaft 103 of the gearbox 6 drives, via a chain 100, one sprocket of a triple sprocket 104 mounted on a shaft 105 on which the sprocket 18 of the front expandable member 8 is mounted, whereby the chains 17 are driven in a clockwise direction as seen in FIGS. 1 and 2. Both chains 17 are driven since the shaft 105 is common to both sprockets 18. A further chain 106 extends around a second sprocket of the triple sprocket 104 and around a sprocket 107 mounted on a common shaft 108 for the two sprockets 49 of the rear expandable member 9, whereby the two chains 48 are also driven in a clockwise direction as seen in FIGS. 1 and 2. Thus the inner runs of the chains 17 and 48 partially defining the bale start chamber 11 move in generally opposite directions so as to impart a rolling motion to the crop material fed to the bale start chamber 11.

A chain 109 extends around the third sprocket of the triple sprocket 104 and around a sprocket 111 provided on one end of the drum 71 of the device 15, whereby the device 15 is driven in a clockwise direction as seen in FIGS. 1 and 2. A pulley 112 is also coupled to the sprocket 111 and a belt 113 extends from pulley 112 to a pulley 114 on the pick-up unit 14 so as to drive the pick-up unit 14 also in a clockwise direction as seen in FIGS. 1 and 2.

In operation of the embodiment of FIGS. 1 to 12, the machine is hitched to the tractor or other towing vehicle via the drawbar 3, with the drive shaft 4 connected to the tractor PTO so that the chains 17,48, the device 15 and the pick-up unit 14 are driven as described above. Thus as the machine is towed across a field of previously cut material, pick-up unit 14 picks up crop material and conveys it rearwardly toward the device 15. The fingers 78 of the device 15 take over the crop material and feed it through the inlet opening of the start chamber 11 and into engagement with the course 70 of the rear expandable member 9. It will be understood from the foregoing description that the slats 22 of the rear expandable member 9 are relatively closely spaced, and therefore serve to carry the crop material upwardly into the start chamber 11 where the crop tumbles and falls downwardly, assisted by the slats 22 of the generally downwardly moving course 60 of the front expandable member 8. The relatively gentle tumbling action of the crop material results in a generally soft core for the bale being formed. However, the rolling action imparted to the crop material by the device 15, and the slats 22 of the courses 60,70 of the expandable members 8,9 results in a smaller core than in a conventional fixed chamber baler. Experience has shown that the core usually starts to roll at a location above the device 15 and inbetween the courses 60,70 of the expandable members 8,9. As the size of the bale core increases, the start chamber 11 becomes full, whereupon the core presses increasingly harder on the slats 22 of the courses 60,70 of the expandable members 8,9 with the result that the course 60 of the expandable member 8 is urged to the left as seen in FIG. 1, and the course 70 of the expandable member 9 is urged to the right, the courses 60 and 70 being urged against the action of the springs 28 and 59, respectively. Accordingly, the layers of crop material surrounding the soft core begin to be more consolidated, and the density of the bale increases to the outer shell thereof since the springs 28 and 59 progressively increase the tension in the chains 17,48 of the expandable members 8,9. It will be understood that the degree of bale compaction depends on the forces exerted by the springs 28 and 59. With the illustrated arrangement it is easy and convenient to vary these spring forces and thus vary the density of the bale.

It should be noted that as the courses 60,70 of the expandable members 8,9 are expanded as the bale increases in size, they form complementary portions as seen in FIG. 2 of the cylindrical bale chamber shape 11'. As already mentioned, this expansion is accompanied by pivotal movement of the arms 23 and the T-shaped supports 53,54 to the positions indicated in FIG. 2. It should also be noted that the arms 23 are pivoted off center in order to minimize the size of the gap between the sprockets 19 and the sprockets 49 through which crop material may be lost.

When the arms 23 and the T-shaped supports 53,54 are in the positions of FIG. 2, the inner and outer runs of the chains 17 are in contact with the sprockets 18 and 19 and the rollers 21, whereby the chains 17 are positively supported in fixed positions with no slack therein. Likewise the chains 48 are positively supported in fixed positions by the sprockets 49,51 and the rollers 52. Thus when the bale size 13 of FIG. 2 is reached the slats 22 of the courses 60,70 of the expandable members 8,9 are moved along a fixed path around the bale being completed. As more crop material is fed into the bale chamber and since the bale chamber cannot expand any further, a hard shell or outer layer is formed on the bale with compaction taking place in an inward direction from the outside. The hardness of this outer shell, and hence its weathering characteristics, depends on the amount of crop material fed into the bale chamber after the bale has reached its maximum diameter. This is comparable to the hard shell which can be produced with conventional fixed chamber balers.

As the bale is nearing completion in the bale chamber, it is supported in part on the drum 71 of the device 15 and on the rotor 16, together with the slats 22 of the rear expandable member 9 as they enter the successive pockets 97 of the rotor 16. This occurs without any undue vibration to the bale in the bale chamber. It will also be understood mainly from FIG. 2, that the front expandable member 8, together with the sprockets 18, and the rear expandable member 9, together with the lower pairs of guide rollers 52 on the lower T-shaped supports 53,54, also assist in supporting the weight of the bale in the bale chamber.

As already mentioned, the particular mounting of the T-shaped supports 53,54 provides compensation for any stretching of the chains 48 of the expandable member 9 as a result of wear. When the bale 13 has been completed, the tailgate 12 is raised (by means not shown) about the shaft 108 and since the center of gravity of the bale 13 lies within the rear portion of the bale chamber shape 11', there is a natural tendency for it to roll from the machine on the raising of the tailgate 12. This tendency is augmented by the action of the device 15, which continues to be driven, and thus positive discharge of a completed bale is achieved.

As soon as a completed bale 13 is discharged from the machine, the springs 28 and 59 return the arms 23 and T-shaped supports 53,54, respectively, to the positions of FIG. 1, whereby the start chamber 11 is re-formed ready for forming the next bale. It will be understood that the machine is capable of forming bales of less than the maximum diameter since bale discharge can be effected at any time by raising the tailgate 12. While any bale less than the maximum size will not have the heavily compacted outer layer or shell, such a bale will hold together if the springs 28,59 have been set to give more density to the bale being formed.

Figure 13:
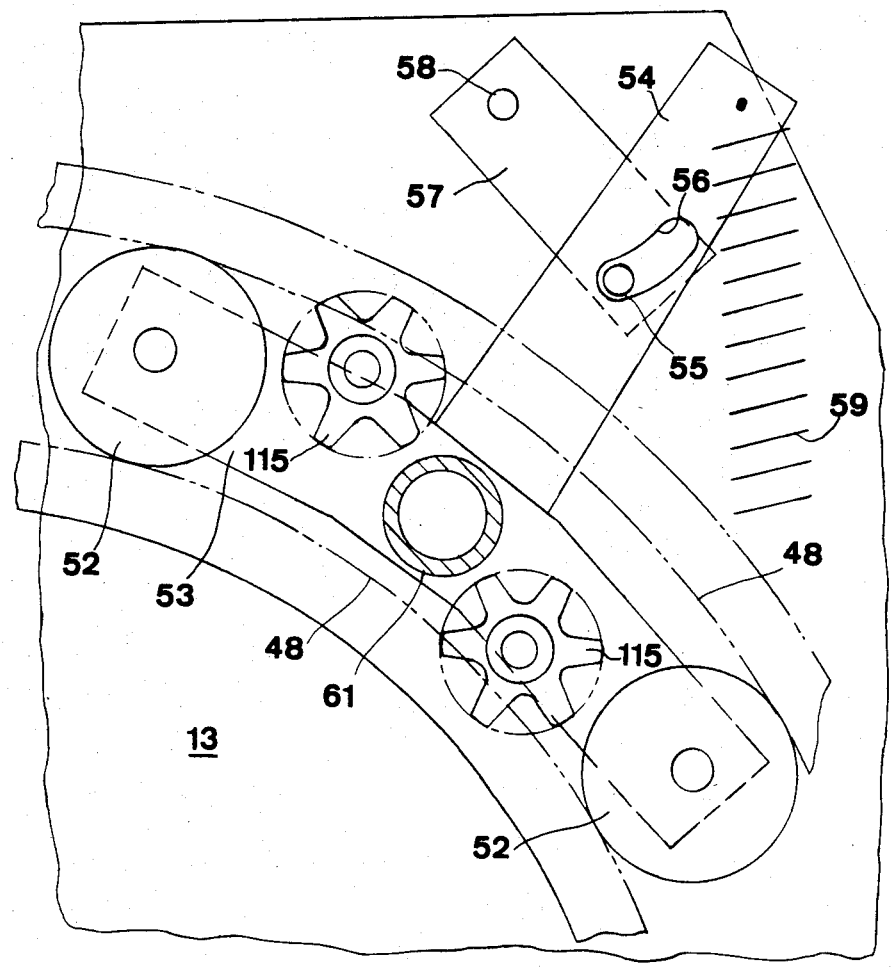
FIG. 13 is a view of an alternative component for the first emobdiment.

Turning now to FIG. 13, there is shown a modified arrangement of the guide means for guiding the chains 48 when a bale has reached its maximum diameter in the bale chamber. FIG. 13 shows one T-shaped support 53,54 in the position attained when a competed bale has been formed. In this arrangement, each T-shaped support 53,54 is provided with two sprockets 115, one in engagement with the inner run of the associated chain 48 at a location proximate one guide roller 52 and the other in engagement with the outer run thereof at a location proximate to the other guide roller 52. The inner and outer runs of the chains 48 engage the rollers 52 when in the position (bale commplete) of FIG. 13. This arrangement improves the guidance of both runs of the chains 48 on the guide rollers 52 when a bale has reached its maximum size within the bale chamber by positively holding the chains 48 in alignment with the rollers 52.

Figure 14:
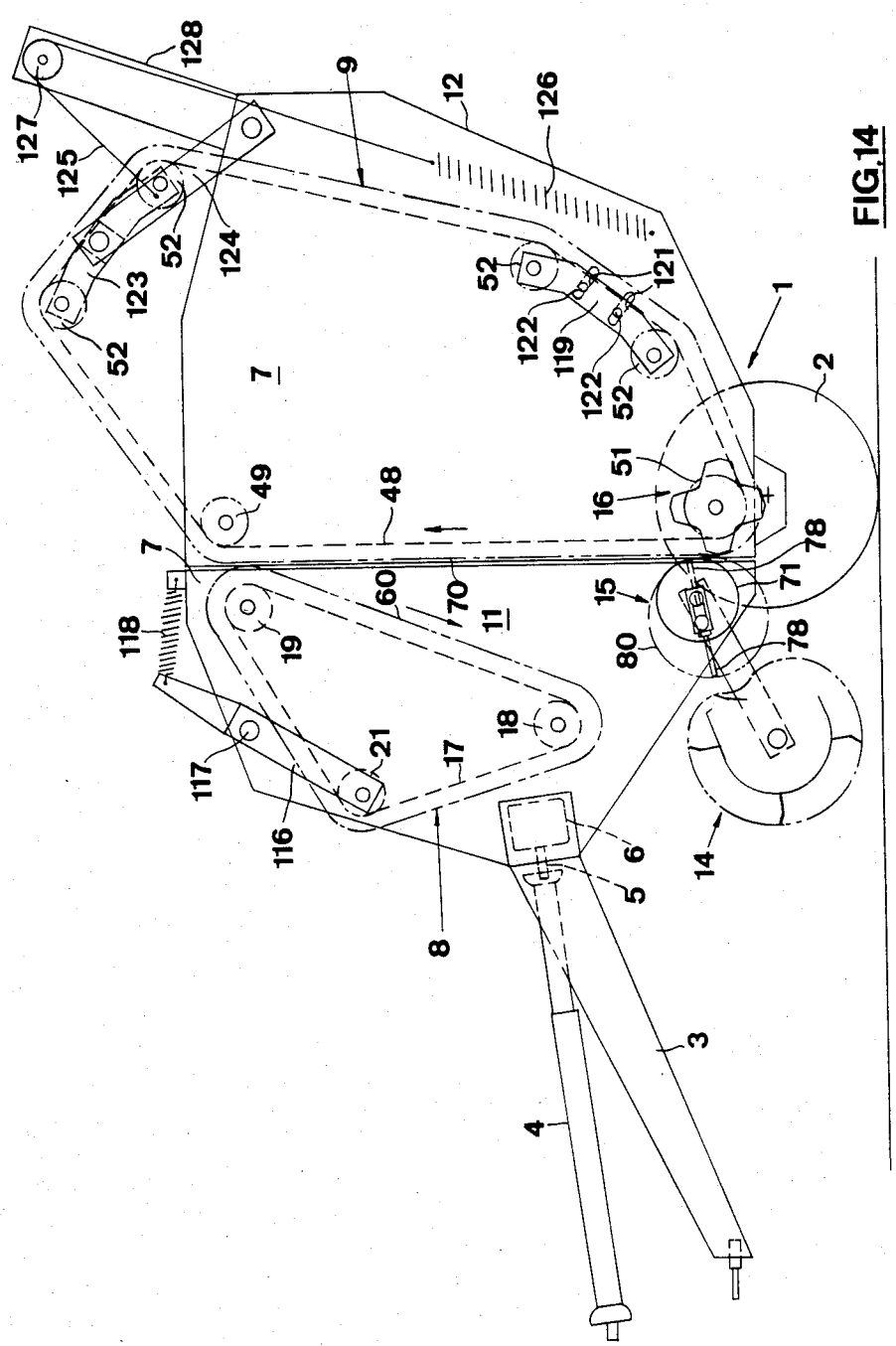
FIGS. 14 and 15 are views similar to those of FIGS. 1 and 2, respectively, but showing a second embodiment.
Figure 15:
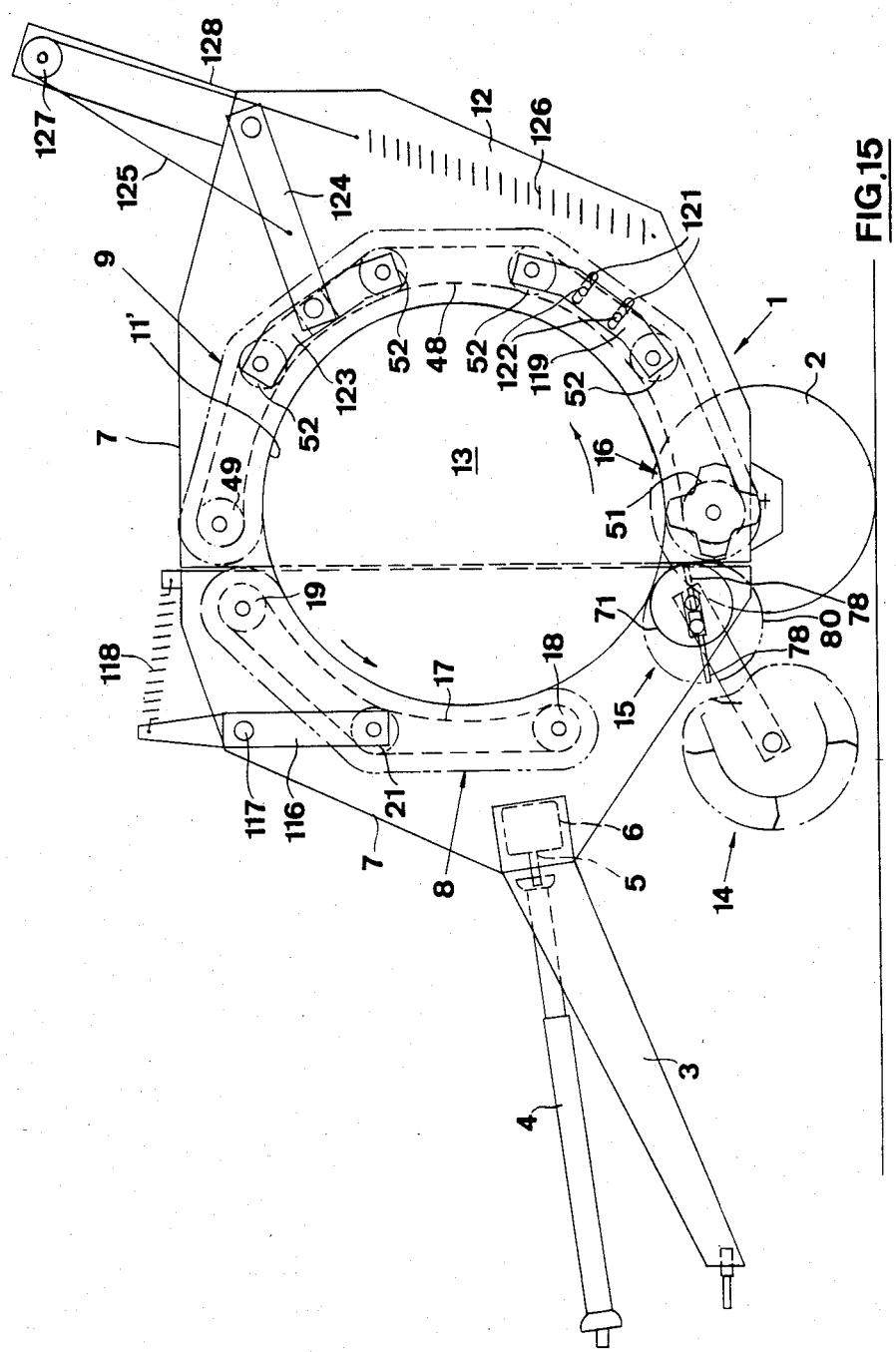

FIGS. 14 and 15 show an alternative embodiment of round baler which is similar to that of FIGS. 1 to 12, the differences being in respect to the chain tensioning devices associated with the front and rear expandable members 8 and 9. In this embodiment the arms 23 are replaced by arms 116 which carry at one end the guide rollers 21, with the sprockets 18,19 being fixed to the frame 1. Each arm 116 is pivoted intermediate its ends on a pivot pin 117, with the other end of the arm 116 connected to one end of a tension spring 118 which is attached at its other end to the frame 1. With this arrangement, the gap between the sprockets 19 of the front expandable member 8 and the sprockets 49 of the rear expandable member 9 remain constant and small so that any loss of crop material therethrough is small. In the embodiment of FIGS. 1 to 12, the sprockets 19 are movable relative to the sprockets 49 as a bale is formed.

In regard to the rear expandable member 9, the lower T-shaped supports 53,54 are replaced by arms 119 which carry the guide rollers 52, with the arms 119 being mounted for limited movement relative to the side walls 7 by virtue of a pair of elongated slots 121 formed in the side walls 7 which slidably receive mounting pins 122 attached to the associated arms 119. This particular mounting, like the position of the support arms 57 in the embodiment of FIGS. 1 to 12, provides compensation for any stretching of the chains 48 as a result of wear. The upper T-shaped supports 53,54 are replaced by arms 123 which carry the rollers 52 and are each centrally pivoted on one end of a further arm 124 which is pivoted at its other end to the frame 1. One end of a cable 125 is attached to each arm 124 intermediate its ends, the other end of the cable 125 being secured to one end of a tension spring 126 which in turn has its other end attached to the frame 1, the cable 125 passing over a pulley 127 on an extension 128 on the frame 1. Thus as the course 70 of the expandable member 9 expands as the bale grows (as already described with respect to the first embodiment), each arm 124 is pulled counterclockwise about its pivot and takes with it the cable 125 which streches the spring 126 associated therewith, thereby increasing the tension in the chains 48 of the expandable member 9. Similarly, the springs 118 increase the tension in the chains 17 of the expandable member 8 as the arms 116 are pivoted counterclockwise and stretch the springs 118. It will be noted that, unlike the embodiment of FIGS. 1 to 12, both guide rollers 52 of each pair of guide rollers engage the outer run of the respective chains 48, when the baler is empty. In all other respects, the operation of the embodiment of FIGS. 14 and 15 is similar to that described for the embodiment of FIGS. 1 to 12.

It will be seen that the present invention provides a round baler which can produce bales with a hard outer shell while the density of the crop material elsewhere within the bale can be varied greatly from a low density comparable to bales produced with conventional fixed chamber balers to a high density comparable to bales produced with conventional expanding chamber balers, thus combining advantages of conventional fixed and expanding chamber balers.

As already mentioned, the device 15 has a dual function in feeding crop material to the bale chamber from the pickup unit 14, and in helping to support the bale as it is being completed. The device 15 thus performs an important function in the formation of a bale and without its presence, the pickup unit 14 would have to be mounted much closer to the inlet opening of the bale chamber.

The function of the rotor 16 is also important in lending further support to each bale as it is formed and in so doing to present, in conjunction with the slats 22 a substantially smooth surface to the bale. To this end, the pockets 97 are formed in the surface of the rotor 16 to accommodate the slats 22 as they pass therearound. As already explained, this prevents the slats 22 from imparting vibrations to the bale being formed which would impair formation.

Alternatively, the expandable members 8,9 may be augmented by one or more fixed bale forming means. Also, the chain and slat type members 8,9 may be replaced by the well known belt type bale forming members.

The present invention provides a round baler capable of producing a bale with a hard outer shell, and with either a relatively high density or a rather low density of crop material elsewhere within the bale. The machine can produce a maximum sized bale in approximately two minutes, provided crop material is fed to the bale chamber at the appropriate rate. Of this bale forming time, between $\frac{1}{3}$ and $\frac{1}{4}$ is devoted to forming the hard outer shell. This is a very important aspect because it provides the possibility of producing with a baler of the type having an expanding bale chamber, bales with a hard outer shell, such as is obtained with known balers of the type having a fixed chamber. It will be understood that the tension initially set in the chains 17,48 of the expandable members 8,9 determines the hardness of the bale core, as well as influencing the overall density of the bale except for the hardness of the outer shell which basically is determined by the amount of crop material fed into the bale chamber after the bale chamber has expanded to its maximum diameter. In general, a baler in accordance with the present invention forms a bale core which is considerably smaller than that provided by known fixed chamber balers due to the positive rolling action imparted to the bale. Thus, the baler produces a highly satisfactory bale having qualities of both soft core and hard core bales without the baler being of complicated mechanical construction.

Having thus described the invention, what is claimed is:

1. A round baler comprising:
    (a) a base frame;
    (b) side walls attached to said base frame;
    (c) first and second expandable members arranged to define together with said side walls an initial generally vertically oriented wedge-shaped start chamber which expands to a generally cylindrical shape during bale formation;
    (d) an arm supporting said first expandable member, said arm being pivotally mounted on at least one of said side walls and carrying guide members at the ends thereof around which said first expandable member passes; and
    (e) upper and lower T-shaped supports supporting said second expandable member, each said T-shaped support being pivotally mounted on at least one of said side walls and carrying a pair of guide members for engaging said second expandable member.

2. The round baler of claim 1, wherein said arm is normally urged in a direction to maintain tension in said first expandable member, and said T-shaped supports are normally urged in opposite directions relative to each other to maintain tension in said second expandable member.

3. The round baler of claim 2, wherein said arm is pivotally mounted on said at least one side wall intermediate the ends of said arm but offset from the center of said arm.

4. The round baler of claim 2, wherein the position of said arm is adjustable vertically with respect to said side walls.

5. The round baler of claim 4, further comprising a pivot shaft connected to said arm, a plate carrying said pivot shaft, said plate being secured to one of said side walls but being movable upwardly and downwardly relative to said one side wall to vertically adjust the position of said arm.

6. The round baler of claim 2, wherein each said T-shaped support includes a stem pivotally mounted to one end of a support arm which is pivotally attached to one of said side walls.

7. The round baler of claim 6, wherein said stem of each said T-shaped support is pivotally mounted to said support arm by a pivot pin which extends through a slot formed in said one side wall.

8. The round baler of claim 7, wherein each said T-shaped support also includes a cross piece carrying said pair of guide members.

9. The round baler of claim 7, further comprising springs normally urging said T-shaped supports in said opposite directions until each said pivot pin engages one end of the associated said slot.

10. The round baler of claim 2, wherein said T-shaped supports are normally urged in said opposite directions so that only one guide member of said pair of guide members on each said T-shaped support engages said second expandable member when said start chamber is empty.

11. In a round baler having a base frame, side walls attached to said base frame, first and second expandable members arranged to define together with said sidewalls an initial generally vertically oriented wedge-shaped start chamber which expands to a generally cylindrical shape during bale formation, the improvement comprising:
(a) an arm supporting said first expandable member, said arm being pivotally mounted on at least one of said side walls and carrying guide members at the ends thereof around which said first expandable member passes; and
(b) upper and lower T-shaped supports supporting said second expandable member, each said T-shaped support being pivotally mounted on at least one of said side walls and carrying a pair of guide members for engaging said second expandable member.

* * * * *